(12) United States Patent  (10) Patent No.: US 6,550,638 B1
Mochida  (45) Date of Patent: Apr. 22, 2003

(54) CUP-SUPPLYING APPARATUS

(75) Inventor: Yukihide Mochida, Saitama-ken (JP)

(73) Assignee: Fuji Electric Co., Ltd., Kanagawa (JP)

( * ) Notice: Subject to any disclaimer, the term of this patent is extended or adjusted under 35 U.S.C. 154(b) by 56 days.

(21) Appl. No.: 09/721,755

(22) Filed: Nov. 27, 2000

(30) Foreign Application Priority Data

Nov. 26, 1999 (JP) .......................................... 11-336345

(51) Int. Cl.⁷ ............................................... B65H 3/52
(52) U.S. Cl. ...................... 221/124; 221/222; 221/223; 221/241; 221/297
(58) Field of Search .......................... 221/92, 123, 124, 221/221, 222, 223, 241, 242, 297

(56) References Cited

U.S. PATENT DOCUMENTS

| 3,071,292 | A | * | 1/1963 | Atwood et al. | |
| 3,098,585 | A | * | 7/1963 | Giepen | |
| 3,807,600 | A | * | 4/1974 | Moss et al. | |
| 4,426,017 | A | * | 1/1984 | Ficken et al. | 221/241 X |
| 4,804,108 | A | * | 2/1989 | Ficken | 221/241 X |
| 4,854,479 | A | * | 8/1989 | Callahan et al. | 221/241 X |
| 5,518,149 | A | * | 5/1996 | Lotspeich et al. | 221/241 X |
| 6,378,728 | B1 | * | 4/2002 | Erikawa | 221/123 |

* cited by examiner

Primary Examiner—David H. Bollinger
(74) Attorney, Agent, or Firm—McDermott, Will & Emery

(57) ABSTRACT

Disclosed is a cup-supplying apparatus for supplying tapered cylindrical cups stored in a stack, which comprises cup dispensers each supplying lowest cup from cups stored in a stack; a unit generating a force for cup-supplying; force-transmitting members each transmitting the cup-supplying force to a corresponding cup dispenser; and means for selecting one of the force-transmitting members to be supplied with the cup-supplying force; whereby the cup-supplying force generated by the force-generating unit is transmitted to the selected force-transmitting member so that the lowest cup is supplied for use by the corresponding cup dispenser, wherein the cup dispenser may be provided with a lever, the force-generating unit may comprise a motor and a cam, the force-transmitting member may be a slider provided between the lever and the cam, and the selecting means may be a mechanism for moving the cam up and down to a position where the slider can transmit the cup-supplying force from the cam to the lever of the corresponding cup dispenser.

15 Claims, 18 Drawing Sheets

CUP-SUPPLYING APPARATUS

FIELD OF THE INVENTION

The invention relates to a cup-supplying apparatus, and more particularly, to a cup-supplying apparatus with improved interchangeability and operation accuracy of a cup dispenser separating each cup from a stack of cups so as to be supplied.

BACKGROUND OF THE INVENTION

A conventional cup-type automatic beverage vendor is provided with a cup-supplying apparatus in which cups in different sizes are stored in a plurality of stacks each having cups of the same size stacked. When a cup of some beverage is demanded, a cup of the demanded beverage is separated from the corresponding stack by a cup-supplying unit and supplied to a cup-serving stage within the serving outlet.

FIG. 1 shows a cup separation unit in a conventional automatic vendor of cup-serving type. Cup separation unit 5 is provided with cup dispensers 5A, 5B and 5C for dispensing cup 8 in accordance with rotation of top 51 having screw-shaped periphery, these cup dispensers being provided respectively for cupsizes "S", "M" and "L", lever 52 fixed integrally to a ring which drives top 51 to rotate (to be mentioned later), driving motors 22A, 22B and 22C for driving lever 52, torque transmitting members 20A, 20B and 20C transmitting torque of driving motors 22A, 22B and 22C, respectively, to rotating member 55, and communicating member 54 for communicating lever 52 with rotating member 55 by way of link pin 53. The rotation of rotating member 55 generated by rotation of driving motors 22A, 22B and 22C is converted by eccentric rotation unit 55a to a reciprocating motion, which is transmitted to lever 52.

FIG. 2 shows top 51. Ring 52A is rotated in the direction A' by shifting in the direction A of communicating member 54 communicated through link pin 53 with lever 52 which is fixed to ring 52A. Ring 52A is provided, on its inner surface, with ring gear 52B engaged with gear 51A fixed on the axis of top 51. The rotation of ring 52A in the direction A' allows top 51 to rotate in the direction of $r_1$. When communicating member 54 shifts in the direction B, ring 52A rotates in the direction B' so as to rotate top 51 in the direction of $r_2$. The rotation of top 51 in the direction of $r_1$ causes a stack of cups 8 (not shown) to fall by one step down the spiral portion. The rotation of top 51 in the direction of $r_1$ interposes the spiral portion between rim 8A of a cup 8 in the lowest position of the stack and rim 8 of another cup in next to the lowest position so as to cause the lowest cup 8 to fall off the stack.

In such a conventional cup-supplying apparatus, however, changing a cup dispenser (such as 5A) for changing, for example, cup size, requires the diameter of the ring (52A) and thus, the rotating angle of the lever (52), to be changed so that the communicating member (54) has to be changed to one suited to the rotating angle of the lever.

This results in the necessity of preparing a multitude of parts such as communicating members in accordance with varied cup sizes. Moreover, a plurality of driving motors are required for operating respective cup dispensers in the conventional cup-supplying apparatus.

SUMMARY OF THE INVENTION

Accordingly, it is an object of the invention to provide a cup-supplying apparatus free from the necessity of preparing a multiplicity of parts for varied cup sizes, thus permitting reduction of parts in number and advancing standardization of parts, thereby making parts-management more easy and decreasing costs for manufacturing and maintenance.

It is further object of the invention to provide a cup-supplying apparatus in which cup dispensers can be easily changed according to variation of cup size by a simple job and costs can be decreased.

According to the first feature of the invention, A cup-supplying apparatus for supplying tapered cylindrical cups stored in a stack, comprising:

a plurality of cup dispensers, each of which supplies a lowest cup from stacked cups to a predetermined position;

a unit for generating a cup-supplying force;

a plurality of members, each of which transmits said cup-supplying force to a corresponding one of said plurality of cup dispensers; and means for selecting one member from said plurality of members to be supplied with said cup-supplying force from said cup-supplying force generating-unit;

wherein said cup-supplying force generating-unit generates said cup-supplying force which is then transmitted to said one member selected by said selecting means, so that said corresponding one among said plurality of cup dispensers supplies said lowest cup to said predetermined position.

According to the second feature of invention, a cup-supplying apparatus for supplying tapered cylindrical cups stored in a stack comprises:

a rotatable ring member having inside thereof a circular inner portion for supporting the stack of cups, the member being capable of rotating around an axis, diameter of the inner portion being varied in accordance with rotating of the member within a range predetermined according to the diameter of tapered cylindrical cups;

means for separating a tapered cylindrical cup in lowest position in the stack from others stored in the stack and allowing the tapered cylindrical cup in the lowest position to drop, according to rotating of the rotatable ring member;

means for rotating the rotatable ring member, including a lever attached to and rotatable together with the rotatable ring member around the axis of rotating thereof and a pin fixed to the lever in rotatable end portion thereof;

a reciprocally-moving member capable of reciprocal movement in a first direction and in a second direction with a predetermined stroke, being driven by a driving force supplied by a source thereof; and movement-transmitting means for transmitting the reciprocal movement of the reciprocally-moving member to the rotatable ring member to cause the rotatable ring member to rotate clockwise and anti-clockwise, the movement-transmitting means comprising pin-engaging means for engaging the pin with the reciprocally-moving member, whereby the reciprocally-moving member is engaged with the means for rotating the rotatable ring member by way of the pin fixed to the lever and the pin-engaging means, wherein:

the pin-engaging means comprises range-varying means which allows the range of rotating of the lever corresponding to the predetermined stroke of the reciprocal movement of the reciprocally-moving member transmitting means to be varied, whereby the range of rotating of the rotatable ring member being determined by the range-varying means.

It is preferred that the pin-engaging means includes a fork member having a recess in distal end portion. The fork member preferably comprises a first recess for accepting the pin with a first margin and a second recess for accepting the pin with a second margin broader than the first margin, whereby the first recess allows the lever having the pin to rotate within a first range and the second recess allows the lever to rotate within a second range smaller than the first range, either according to the predetermined stroke of reciprocally-moving member. It is preferred that the first recess is formed adjacent to bottom portion of the second recess. The rotatable ring member, the means for separating a tapered cylindrical cup and the means for rotating the rotatable ring member may be integrated in a unit.

The cup-supplying apparatus may comprise a plurality of the units, a plurality of the reciprocally-moving member and a plurality of the movement-transmitting means, equal in numbers, wherein the reciprocally-moving members are driven by a source in common. Then, the reciprocally-moving members may be conjugated, being permitted to move independently. Preferably, the movement-transmitting means each comprise pin-engaging means in the same form, respectively, and the pin-engaging means are connected respectively with the reciprocally-moving members conjugated to be capable of moving independently.

The reciprocally-moving member may include a rotating motor as the source of driving force and a cam unit for converting rotation of the rotating motor to reciprocal movement to be transmitted to the reciprocally-moving member. Then, the reciprocally-moving member preferably comprises means for preventing the cam unit from accidental discontinuing of the transmission of movement.

BRIEF DESCRIPTION OF THE DRAWINGS

The invention will be explained in more detail in conjunction with the appended drawings, wherein:

FIG. 14($b$) is a side view of a cup dispenser, including a partial cross-section, in the cup-supplying apparatus in the first preferred embodiment of the invention;

FIG. 15($b$) is a side view showing a cup dispenser when it is fixed in position;

DESCRIPTION OF THE PREFERRED EMBODIMENTS

A cup-supplying apparatus in the first preferred embodiment of the invention will be explained below.

Figure 3:
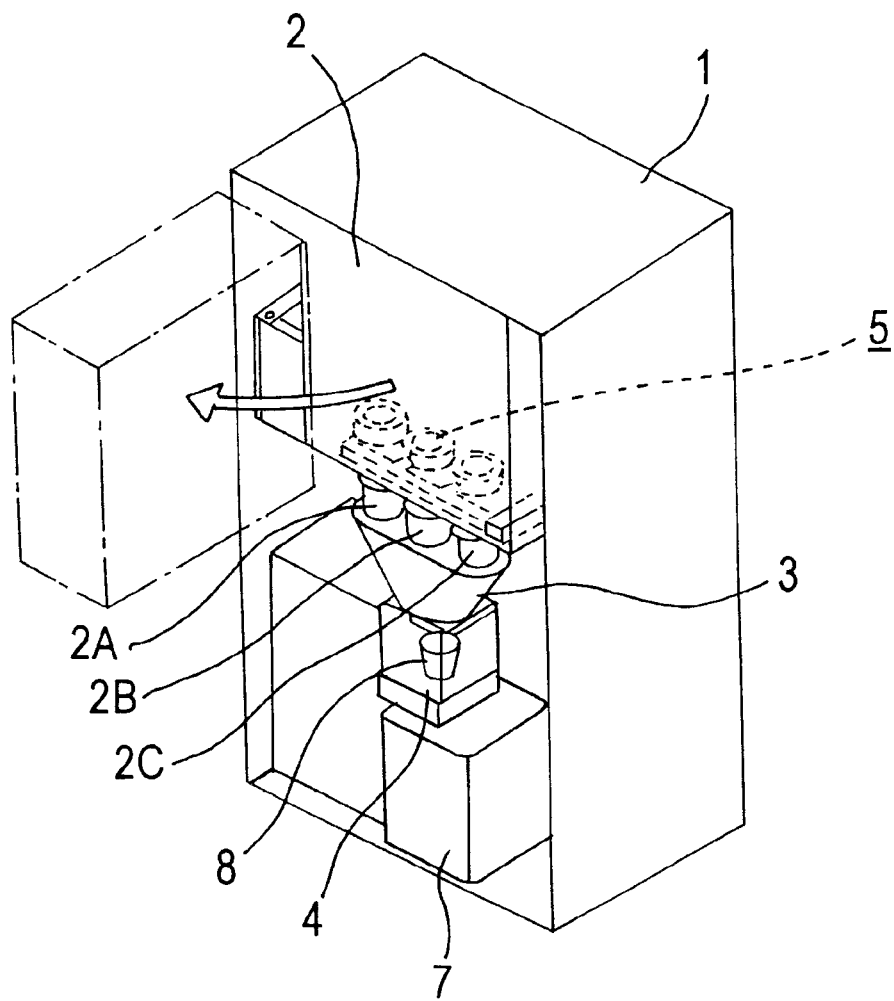
FIG. 3 is a perspective view of a cup-supplying apparatus in a first preferred embodiment according to the invention.

FIG. 3 shows a preferred embodiment of a cup-supplying apparatus according to the invention for a cup-type vending machine. The cup-supplying apparatus is provided, in the upper part of main body 1, with cup storage unit 2 in which cups 8 are stored in separate stacks according to the cup sizes, "S", "M" and "L". Cup storage unit 2 is provided with cup-dispensing outlets 2A, 2B and 2C corresponding to cup sizes, "S", "M" and "L", respectively, in the lower part thereof. The cup-supplying apparatus is provided also with cup separation unit 5 arranged in accordance with cup-dispensing outlets 2A, 2B and 2C for supplying cups 8 stored in cup storage unit 2 in separate stacks according to the cup sizes, one by one into one of cup-dispensing outlets 2A, 2B and 2C, cup shoot 3 shaped like a compressed hopper elongated in alignment with cup-dispensing outlets 2A, 2B and 2C, cup stage 4 for placing cup 8 supplied by way of cup shoot 3, and drain vessel 7 for receiving the beverage etc. spilt from cup 8.

Figure 1:
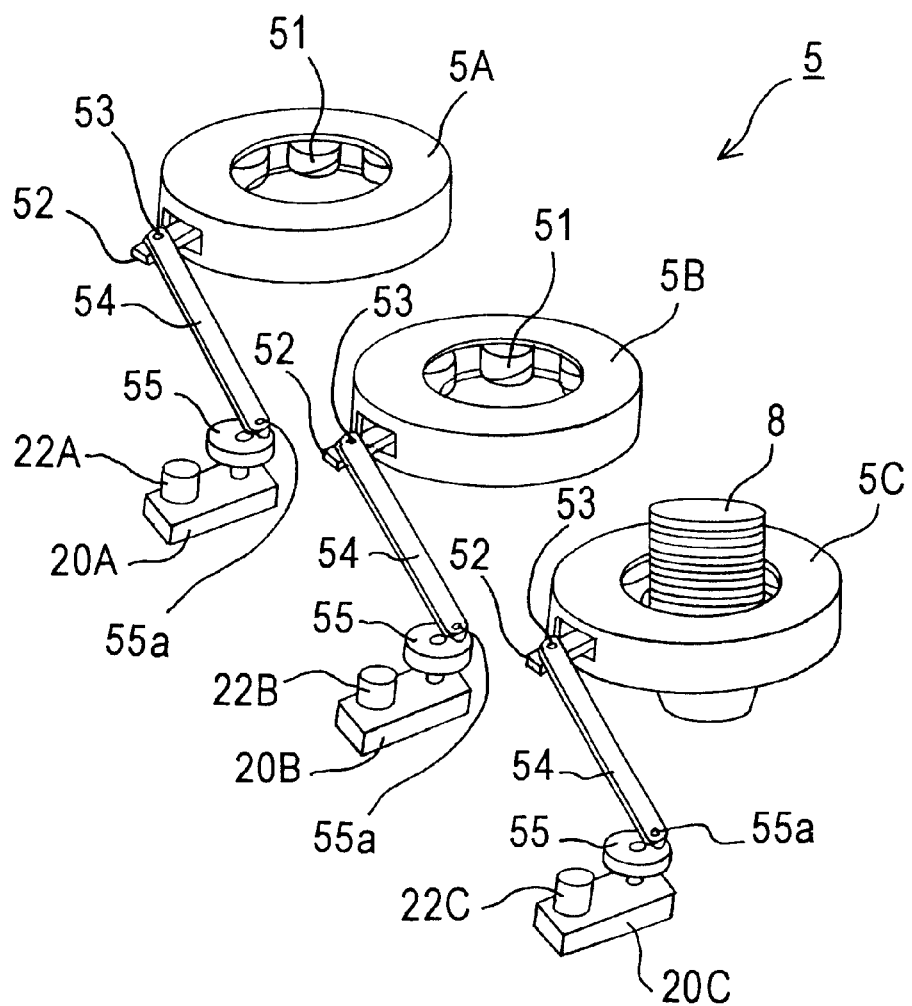
FIG. 1 is a perspective view of a conventional cup-supplying apparatus.
Figure 2:
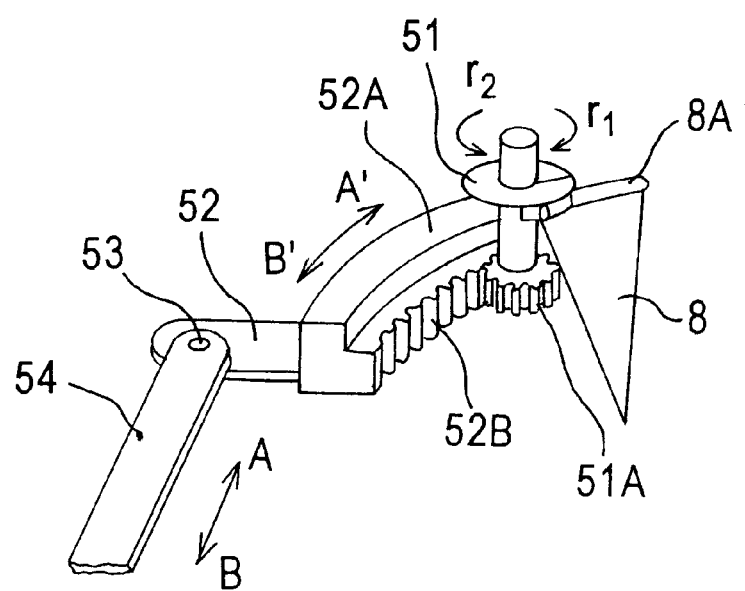
FIG. 2 is an explanatory view showing a part of the system for supplying and separation of cups in the conventional cup-supplying apparatus in FIG. 1.
Figure 4:
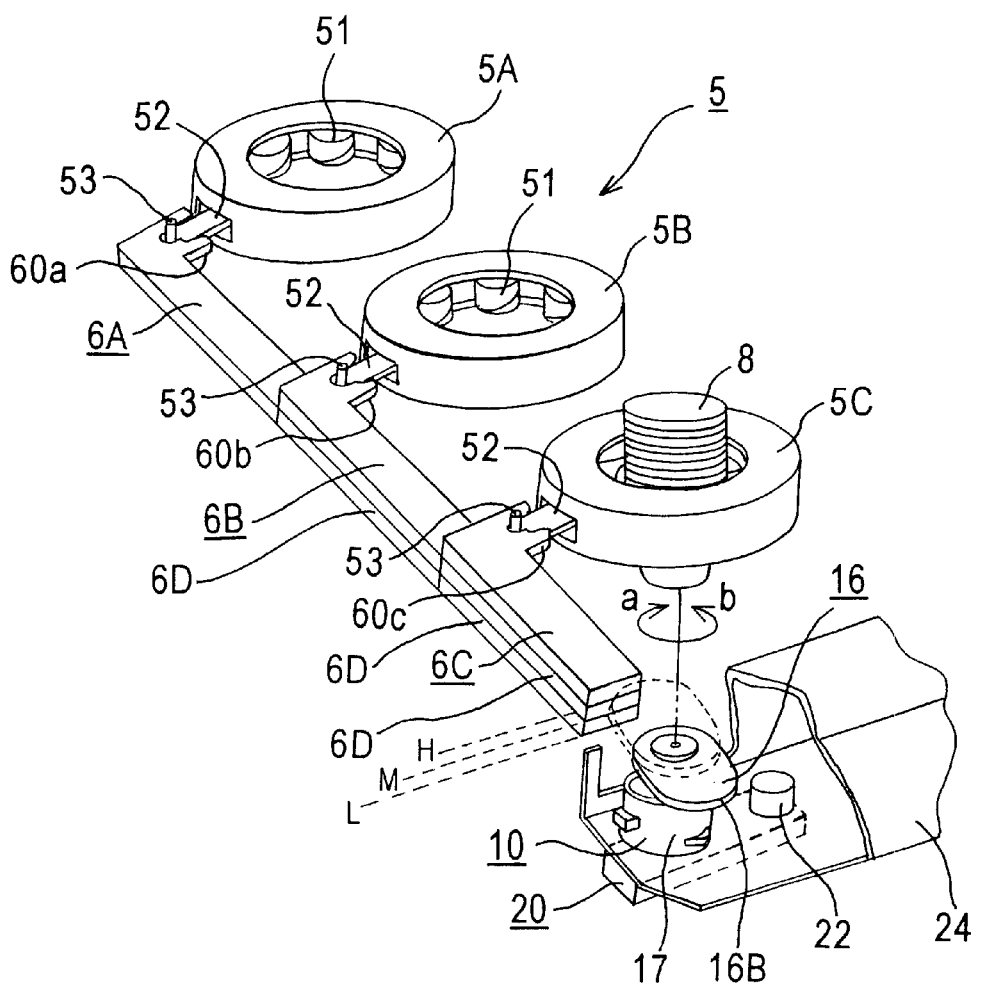
FIG. 4 is a perspective view of the cup separation unit in the cup-supplying apparatus in the first preferred embodiment of the invention, including a partial cross-sectional view.

FIG. 4 shows cup separation unit 5 in cup storage unit 2 of the cup-supplying apparatus according to the invention. Cup separation unit 5 is provided with cup dispensers 5A, 5B and 5C for dispensing cup 8 of cup sizes "S", "M" and "L", respectively, based on the rotation of top (spinning top) 51 having a screw-shaped surface, lever 52 fixed integrally with a ring (not shown) for rotating top 51, torque transmission unit 20 for transmitting the rotating torque of driving motor 22, and cam driving-unit 10 having top 17 allowed to rotate by the rotating torque transmitted by torque transmission unit 20. Cup separation unit 5 including cup dispensers 5A, 5B and 5C, top 51 and lever 52 is basically similar to that shown in FIG. 2.

Cam-driving unit 10 is provided with top 16 having cam portion 16B which is shifted to level H, M or L based on the rotation of top 17 in direction "a" and rotated together with top 17 according to the rotation of top 17 in direction "b". Sliders 6A, 6B and 6C come into contact with cam portion 16B, converting the rotation of top 17 to a reciprocal movement respectively. The positions of sliders 6A, 6B and 6C correspond to levels H, M and L, respectively, mentioned above. Cam-driving unit 10, torque transmission unit 20 and driving motor 22 are united integrally by means of frame 24. Cam driving unit 10 drives cup dispensers 5A, 5B and 5C by way of sliders 6A, 6B and 6C which come into contact with cam portion 16B so as to convert rotation of top 16 to reciprocal motion. Driving motor 22 is a DC motor which can rotate in a predetermined direction by selecting the direction of current.

While cup 8 of sizes "S", "M" and "L" may be stored in cup dispensers 5A, 5B and 5C, respectively, in cup separation unit 5 mentioned above, cups stored in cup dispensers 5A and 5C, for example, may be equal in sizes but different in printed pictures or materials.

Sliders 6A, 6B and 6C are formed of planar members stacked together and provided with fork members 60a, 60b and 60c, respectively, for handling link pin 53 fixed to lever 52. Sliders 6A, 6B and 6C are urged toward cam portion 16B by means of a spring (not shown). Sliders 6A, 6B and 6C have different lengths so as to communicate with cam portion 16B. Any of sliders 6A, 6B and 6C, however, may consist of fork member 60a, 60b and 60c in same shape and equal size (thus recited simply as fork member 60 in FIG. 5 and following drawings) and extension member 6D connected with a fork member in the longitudinal direction. In FIG. 4, two extension members 6D, 6D are connected to slider 6A and single extension member 6D is connected to slider 6B to obtain the required lengths to communicate with cam portion 16B.

Figure 5:
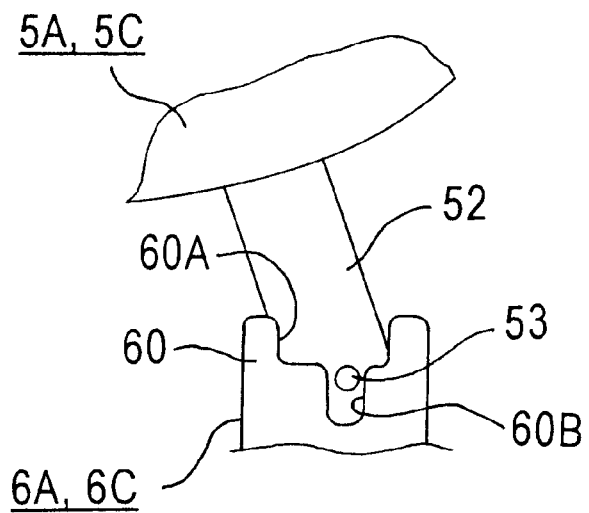
FIG. 5 is an explanatory view of the lever and fork member in the cup-supplying apparatus in the first preferred embodiment of the invention.

FIG. 5 shows an important portion of lever 52 and fork member 60 shown in FIG. 4. Fork member 60 in each of sliders 6A, 6B and 6C has broad opening 60A and narrow opening 60B. Narrow opening 60B is slightly larger in breadth than the diameter of link pin 53 so as to allow link pin 53 to enter (to accept the pin) and broad opening 60A is larger in breadth than narrow opening 60B providing link pin 53 with a margin of movement within the opening. Broad opening 60A and narrow opening 60B allows some shift of link pin 53 in the longitudinal direction of fork member 60 owing to the relative movement of link pin 53 (moving in a circle) with respect to fork member 60 (moving linearly) according to the reciprocal movement of slider 6A, 6B or 6C.

Figure 6A:
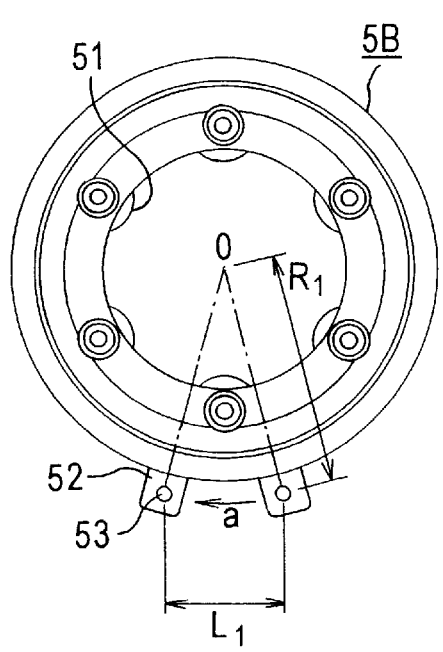
FIGS. 6($a$) and 6($b$) are explanatory views of the cup-supplying apparatus in the first preferred embodiment of the invention.
Figure 6B:
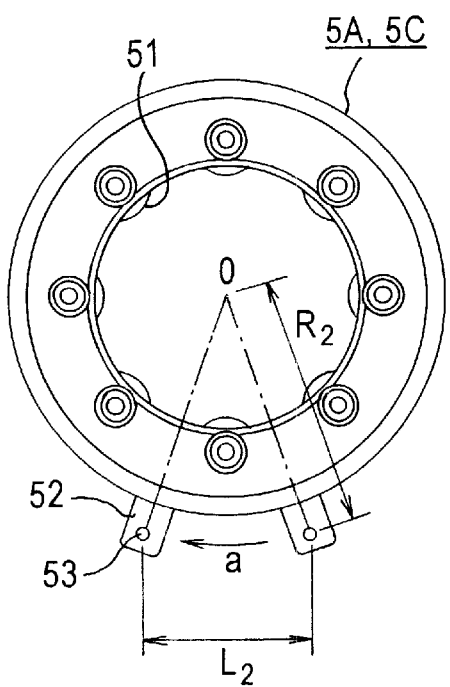

FIG. 6(a) and FIG. 6(b) shows cup dispensers 5A, 5B and 5C in more detail. Top 51 is rotated clockwise by about 270 degrees in response to the movement of lever 52 in direction "a". Cups stored in cup dispensers 5A and 5C are assumed to be equal in dimensions, i.e., having size "L". Either of cup dispensers 5A and 5C is different from 5B in the length, $R_2$ and $R_1$, from axis of rotation O to link pin 53, so that horizontal movements $L_2$ and $L_1$ required for rotation of top 51 differ from each other (see FIG. 7).

Figure 7:
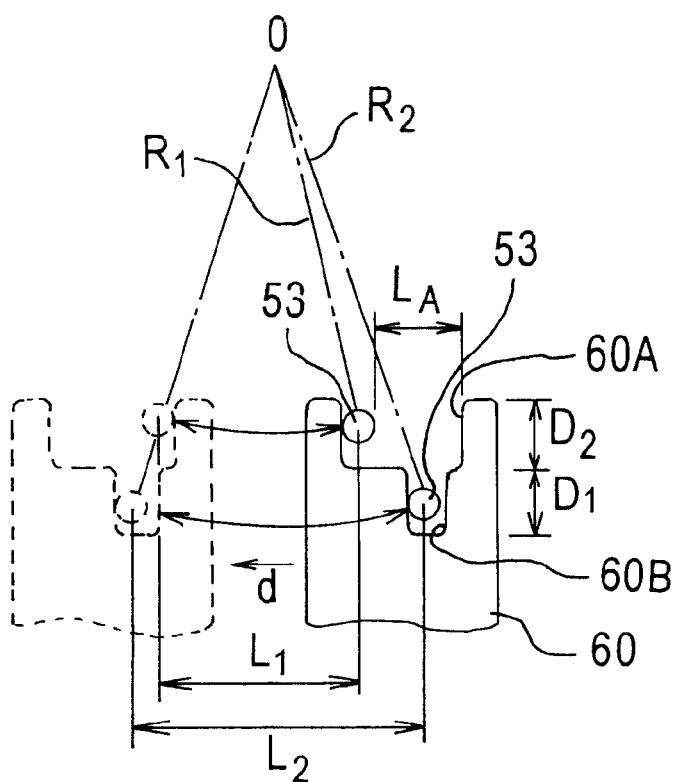
FIG. 7 is an explanatory view showing the arrangement of the fork member and link pin in the cup-supplying apparatus in the first preferred embodiment of the invention.

FIG. 7 shows the arrangement of fork member 60 and link pin 53. The distance from axis of rotation O of lever 52 to link pin 53 is $R_2$ with respect to the rotation of link pin 53 for cup dispensers 5A and 5C by means of fork member 60. In this case, link pin 53 is allowed to enter into narrow opening 60B. When fork member 60 is moved in amount d, link pin 53 is shifted horizontally by an amount $L_2$ to the position indicated by a broken line. Narrow opening 60B has a depth $D_1$ from the bottom of broad opening 60A in order to allow vertical movement of link pin 53 due to the rotation of lever 52.

The distance from axis of rotation O of lever 52 to link pin 53 is $R_1$ with respect to the rotation of link pin 53 for cup dispenser 5B due to the linear movement of fork member 60. In this case, link pin 53 enters into broad opening 60A, but not into narrow opening 60B. When fork member 60 is moved in amount d, link pin 53 is shifted horizontally in amount $L_1$ to the position indicated by a broken line. Amount of movement $L_1$ of link pin 53 is equal to $d-L_A$. Broad opening 60A has depth D2 from the distal end of fork member 60 in order to allow vertical movement of link pin 53 according to the rotation of lever 52.

Figure 8:
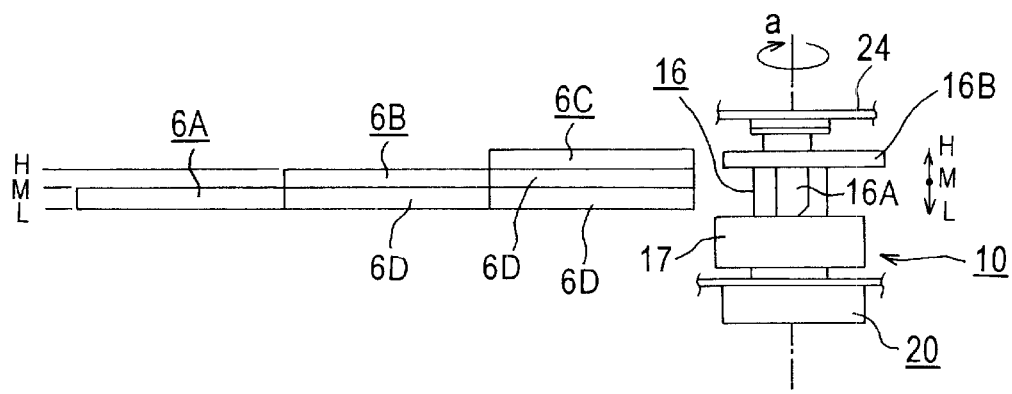
FIG. 8 is an explanatory view showing the operation of the cam-driving unit for selecting the position to drive in the cup-supplying apparatus in the first preferred embodiment of the invention.

FIG. 8 shows the operation of cam-driving unit 10 for selecting the position to drive. Top 16 moves vertically as top 17 turns in direction "a" by rotational torque transmitted through torque transmission unit 20. Top 16 stops in levels L, M and H if it is free from driving at these positions. Cam portion 16B of top 16 is positioned in level H. Top 17 falls from level H, after staying there, to level L.

Figure 9:
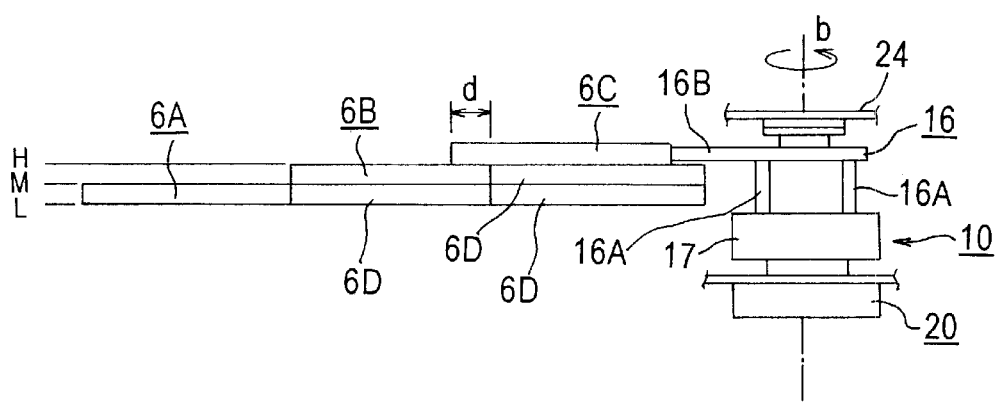
FIG. 9 is an explanatory view showing the cup-supplying operation of cam-driving unit in the cup-supplying apparatus in the first preferred embodiment of the invention.

FIG. 9 shows the operation of cam-driving unit 10 with respect to cup supplying function. Top 16 moves vertically as top 17 turns in direction "a" by rotating torque transmitted through torque transmission unit 20. As shown in FIG. 9, cam portion 16B of top 16 pushes slider 6C staying at position H to cause the movement d which is determined by the amount of projection of cam portion 16B.

Figure 10:
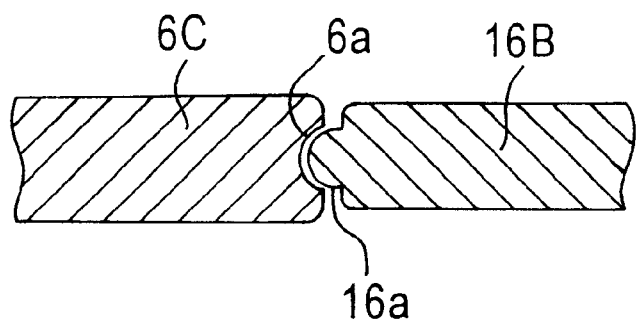
FIG. 10 is an explanatory view showing a portion of the slider in contact with cam portion in the cup-supplying apparatus in the first preferred embodiment of the invention.

FIG. 10 shows the portion of slider 6C in contact with cam portion 16B in detail. Recess 6a having curved surface is formed on the side of slider 6C while projection 16a having curved surface is formed on cam portion 16B. Recess 6a of slider 6C is engaged with projection 16a of cam portion 16B when slider 6C comes into contact with cam portion 16B. According to this construction, projection 16a is held in the middle in the thickness of recess 6a of slider 6C, so that cam portion 16B is prevented from escaping from slider 6C in driving operation so that transmission of the torque from cam portion 16B of top 16 to slider 6C is ensured. Sliders 6A and 6B are constructed in a similar manner.

Figure 11:
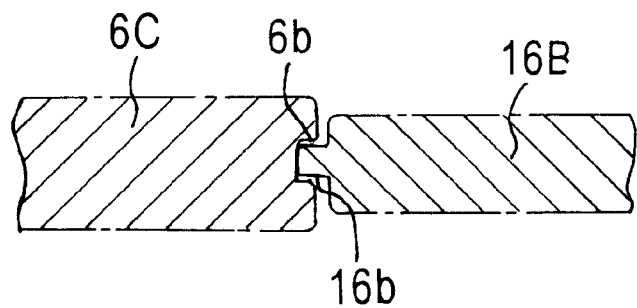
FIG. 11 is an explanatory view showing another construction of a portion of the slider in contact with cam portion in the cup-supplying apparatus in the first preferred embodiment of the invention.

FIG. 11 shows another construction of the portion of slider 6C in contact with cam portion 16B. Slider 6C and cam portion 16B are provided with recess 6b and projection 16b, respectively, both of which are in rectangular form. Recess 6b of slider 6C and projection 16b of cam portion 16B are engaged with each other.

Figure 12:
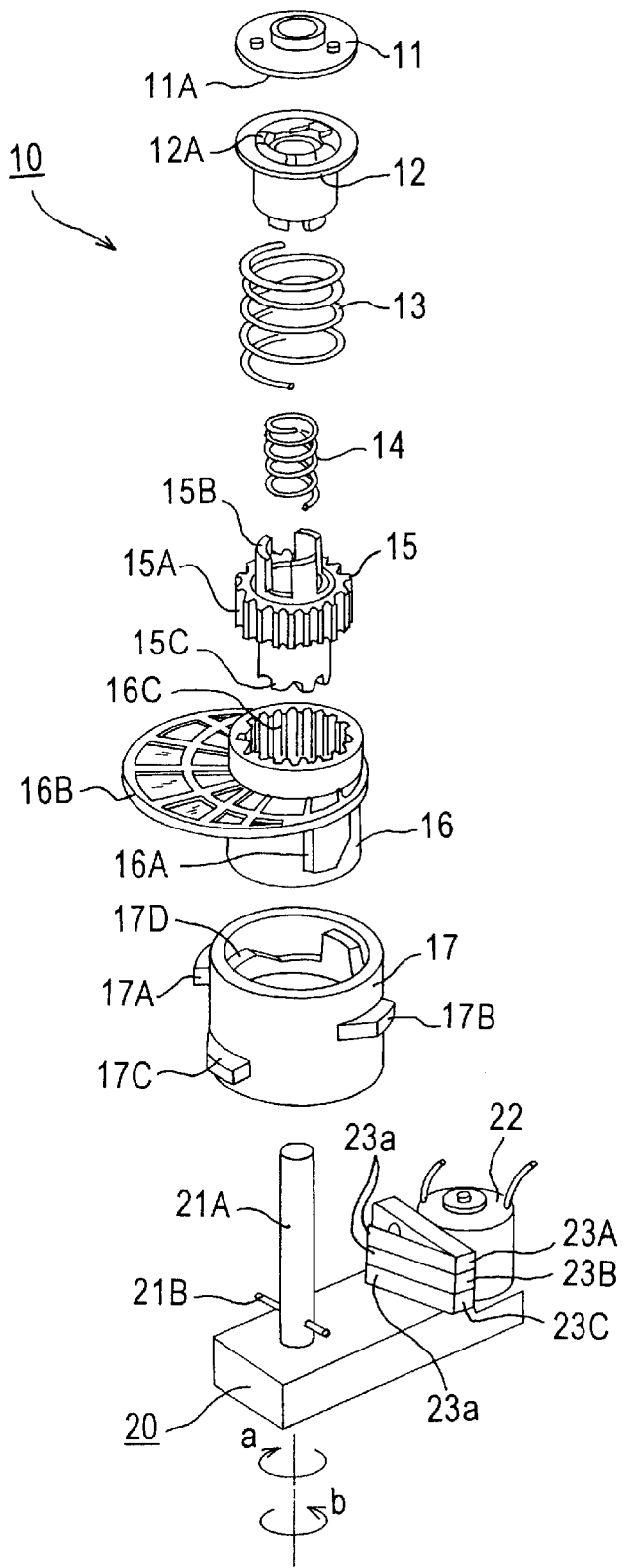
FIG. 12 is a exploded perspective view of the cam-driving unit in the cup-supplying apparatus in the first preferred embodiment of the invention.

FIG. 12 is an exploded view of cam-driving unit 10. Cam-driving unit 10 is provided with stopper 11, top 12, spring 13, spring 14, top 15, top 16, top 17, rotating axis 21A and switches 23A, 23B and 23C. Engaging projection 11A shaped like a saw and having vertical and horizontal surfaces is formed in the lower part of stopper 11 in a circular form. Top 12 has engaging projection 12A to be engaged with engaging projection 11A of stopper 11. Top 15 has teeth 15A formed on the outer edge, circular comb-like projection 15B and engaging projection 15C having circular edge which is formed in the lower part of top 15. Projection 15B can be engaged with circular comb-like projection 12B (explained later). Spring 14 is held by top 12 and top 15 between them. Top 16 has projection 16A, cam portion 16B and teeth 16C. Top 16 is urged downward by spring 13 interposed between top 12 and top 16. Top 17 is provided with projections 17A, 17B and 17C for switching, located on the outer surface at a predetermined positions, respectively. Top 17 is provided also with projection 17D on the outer surface thereof, for engagement with projection 16A of top 16, which is to be contained therein. Rotating axis 21A is engaged with pin-engagement member (not shown) of top 17 by way of engaging pin 21B so as to rotate top 17 by transmitting rotating torque of driving motor 22. Switches 23A, 23B and 23C are provided with switching plates 23a, 23b and 23c, respectively, which can come into contact with projections 17A, 17B and 17C, respectively, to generate power-off signals for driving motor 22. An alternative means for switches 23A, 23B and 23C is, for example, a rotary encoder which detects the amount of rotation of top 17 and generates a power-off signal when the detected amount reaches a predetermined value.

Figure 13:
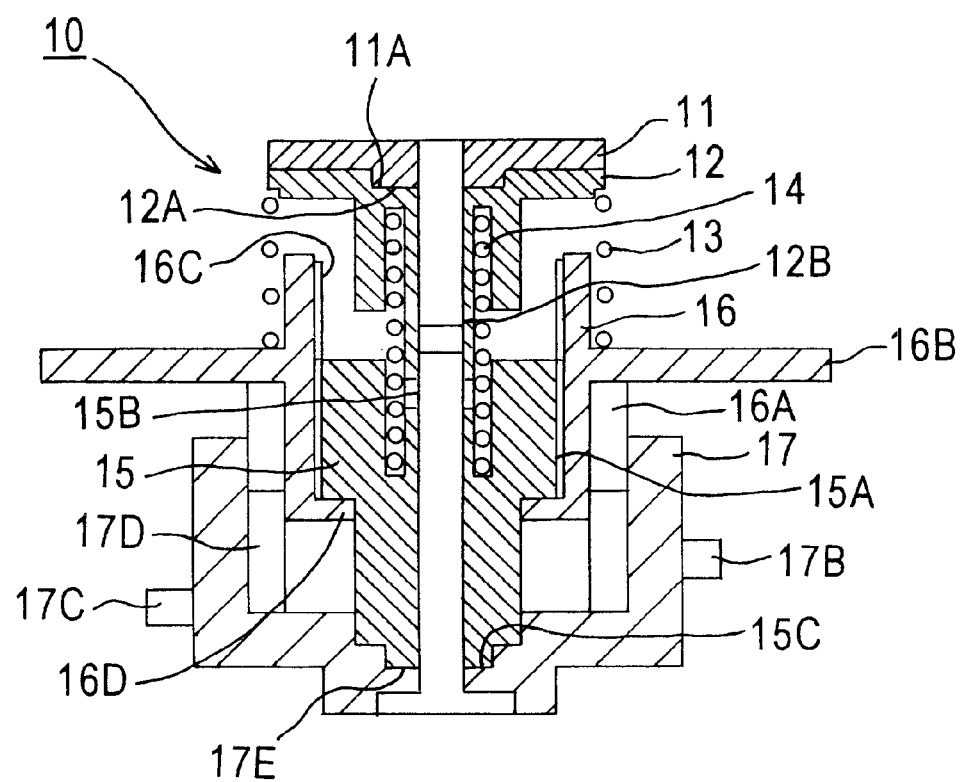
FIG. 13 is a cross-sectional view of the cam-driving unit in the cup-supplying apparatus in the first preferred embodiment of the invention.

FIG. 13 is a cross-sectional view of a portion of cam-driving unit 10 including top 15, top 16 and top 17, in which frame 24, torque transmission unit 20, rotation axis 21A and engagement pin 21B are omitted. Top 15 functions as a one-way clutch based on engagement of engaging projection 15C disposed in the lower part with engaging projection 17E formed inside top 17. The one-way clutch formed of top 15 is activated (transmitting the torque) or inactivated (not transmitting the torque) depending on the rotating direction of top 17. Top 15 is allowed to shift vertically while top 17 is inactive, circular projection 15B shaped like a comb being engaged with circular projection 12B of similar shape formed on top 12. Top 16 can move vertically, sliding along teeth 16C. As top 16 is urged downward by spring 13 disposed between top 12 and top 16, projection 16A on top 16 (see FIG. 11) comes into contact with projection 17D formed inside of top 17 (see FIG. 11), bringing cam portion 16B to a predetermined height (vertical position). But further movement of top 15 relative to top 16 is prevented by means of stopper 16D provided in the lower part thereof which prevents top 15 from escaping therefrom.

Driving motor 22 causes rotating axis 21A to rotate clockwise (in direction "a") or anti-clockwise (in direction "b"). Top 17 engaged with engaging pin 21B fixed to rotating axis 21A is rotated in direction "a" or "b" in accordance with the rotation of rotating axis 21A. When projections 17A, 17B and 17C, during the rotation of top 17, press switching plates 23a, 23b and 23c, respectively, driving motor 22 stops its rotation so that top 16 engaged with top 17 stays in the corresponding positions. Rotation of driving motor 22 is restored when another supply of beverage is demanded. Top 16 is allowed to rotate according to the rotation of top 17 in direction "b" because top 17 causes to rotate top 15 engaged with the former by means of projection 15C and projection 17D in engagement (as shown in FIG. 13) and the rotation of top 15 is transmitted to top 16 having teeth 16C engaged with teeth 15A so as to rotate top 16 in direction "b". When top 17 rotates in direction "a", engagement of projection 15C with projection 17D is not effective so that top 15, thus top 16, is freed from rotation of top 17 in direction "a". While top 17 turns in direction "a", top 16 being free from rotation can ascend and descend relative to top 17 and top 15, as teeth 15A can slide in teeth 16C vertically (in the longitudinal direction of top 15 and top 16) in spite of engagement with respect to their rotation. As top 16 ascends and descends according to the rotation of top 17 turns in direction a, top 16 can take positions (levels) H, M and L corresponding to the levels of sliders 6C, 6B and 6A, respectively (see FIG. 4, FIG. 8 and FIG. 9). At these points, driving motor 22 stops because of switches 23A, 23B and 23C being off, respectively, and thus, top 16 having cam portion 16B to be engaged with sliders 6C, 6B and 6A, respectively, stays in level H, M or L.

Figure 14A:
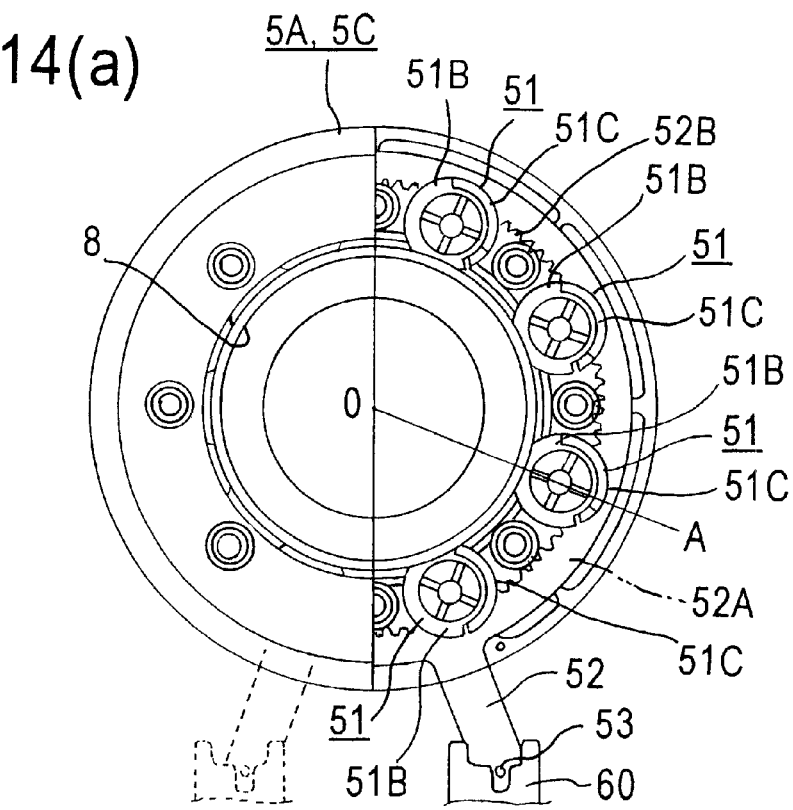
FIG. 14($a$) is a plan view of a cup dispenser, including a partial cross-section, in the cup-supplying apparatus in the first preferred embodiment of the invention.
Figure 14B:
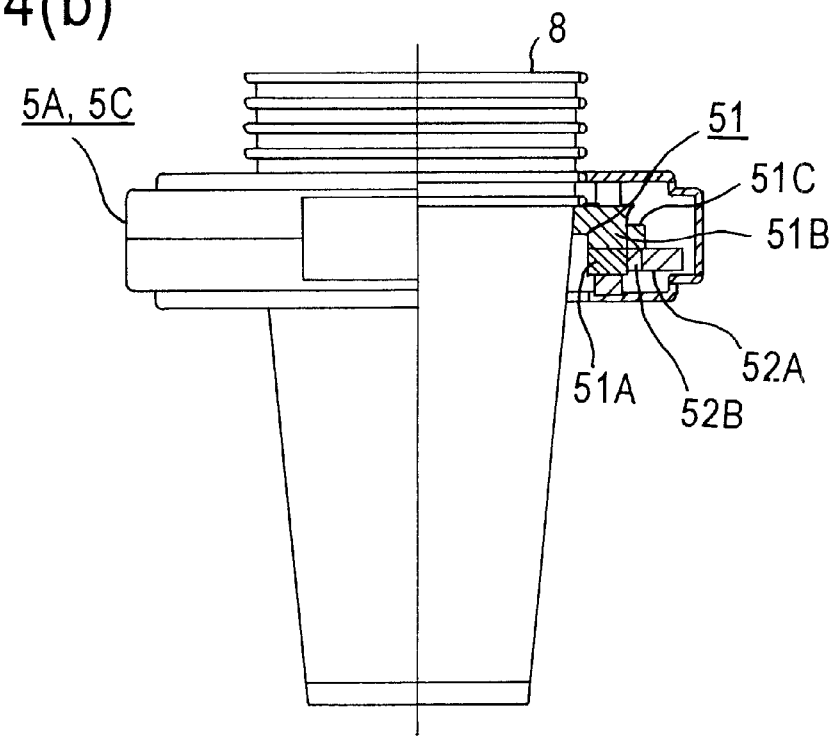

FIGS. 14(a) and 14(b) show the cup dispenser which contains cups. FIG. 14(a) is a plan view and FIG. 14(b) is a side view. Partial cross-section shown in FIG. 14(b) is a cross-section along O–A in FIG. 14(a). Top 16 is provided with gear 51A, screw portion 51B and step portion 51C. Gear 51A can be engaged with ring gear 52B. Screw portion 51B can be inserted between flanges of neighboring cups in a stack by rotating anti-clockwise before the lowest cup in a stack is dropped separately from the next one. Step portion 51C has a height lower than the upper end of screw portion 51B. The diameter of ring 52A depends on the diameter of flange of cup 8.

Figure 15A:
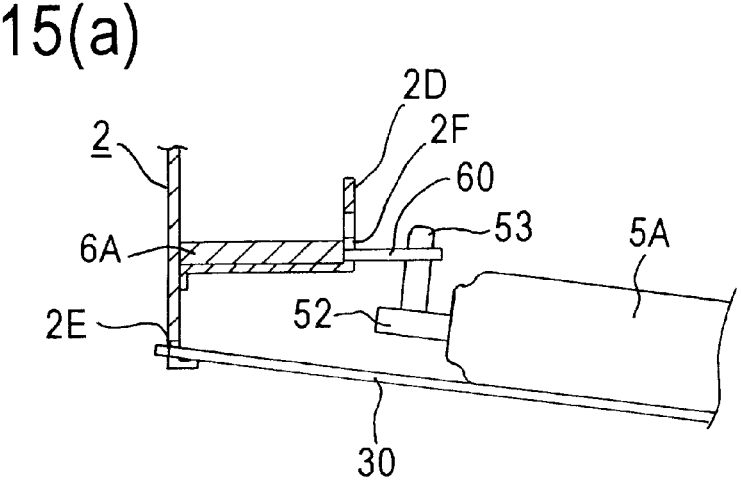
FIG. 15($a$) is a side view showing a cup dispenser just before it is in position.
Figure 15B:
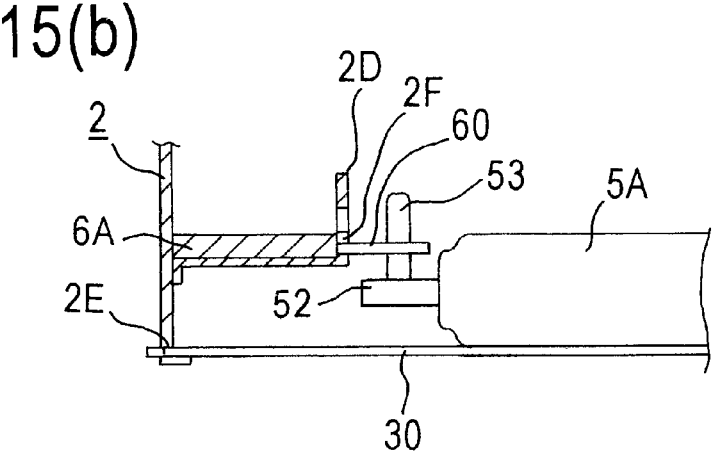

FIGS. 15(a) and 15(b) show cup dispenser 5A before and when it is in position. FIG. 15(a) shows cup dispenser 5A just before it is in position. FIG. 15(b) shows cup dispenser 5A when it is fixed in position. Cup dispenser 5A is mounted on mounting member 30 which is then fixed at the predetermined position in cup storage unit 2, whereby cup dispenser 5A takes up its position. Cup storage unit 2 is provided with supporting member 2D for supporting slider 6A slidably and with fixing hole 2E for positioning of mounting member 30. Fork member 60 of slider 6A is projected out of supporting member 2D by way of through hole 2F formed through supporting member 2D. For mounting cup dispenser 5A, one end portion of mounting member 30 is inserted into fixing hole 2E and, then, the other end portion (not shown) of mounting member 30 is fixed by means of a locking member (not shown). It is required that lever 52 is arranged at the position where link pin 53 enters into the narrow opening (not shown in FIGS. 15(a) and 15(b)) of fork member 60 in case where lever 52 has diameter R2 and link pin 53 has to move with stroke L2 (refer to FIGS. 6 and 7. Similar is the case for cup dispensers 5B and 5C though they are not shown.

FIGS. 16(a) through 16(d) show cup-separating operation of cup dispensers 5A and 5C for cups of size L".

Figure 16A:
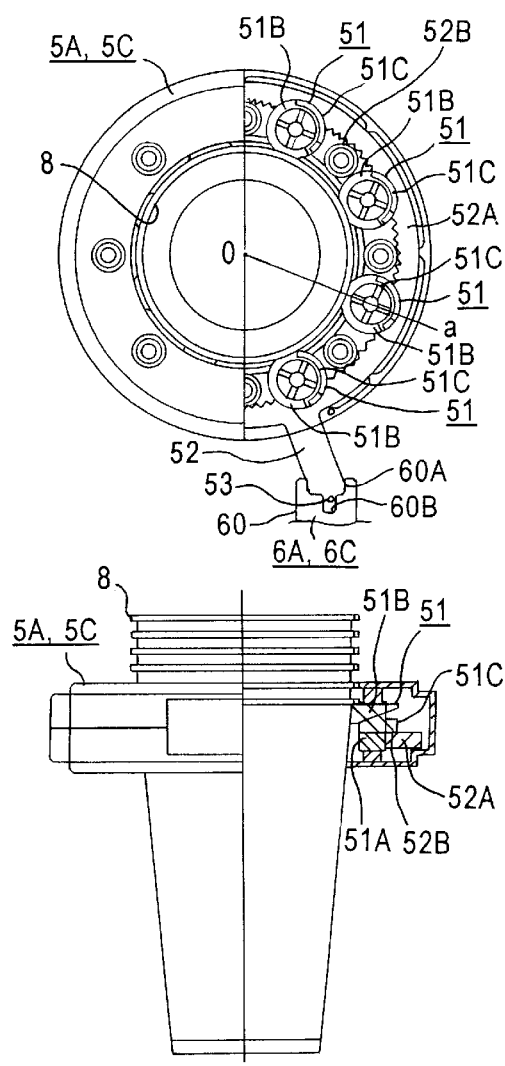
FIGS. 16($a$) through 16($d$) are explanatory views showing the cup-separating operation of cup dispensers in the cup-supplying apparatus in the first preferred embodiment of the invention.
Figure 16B:
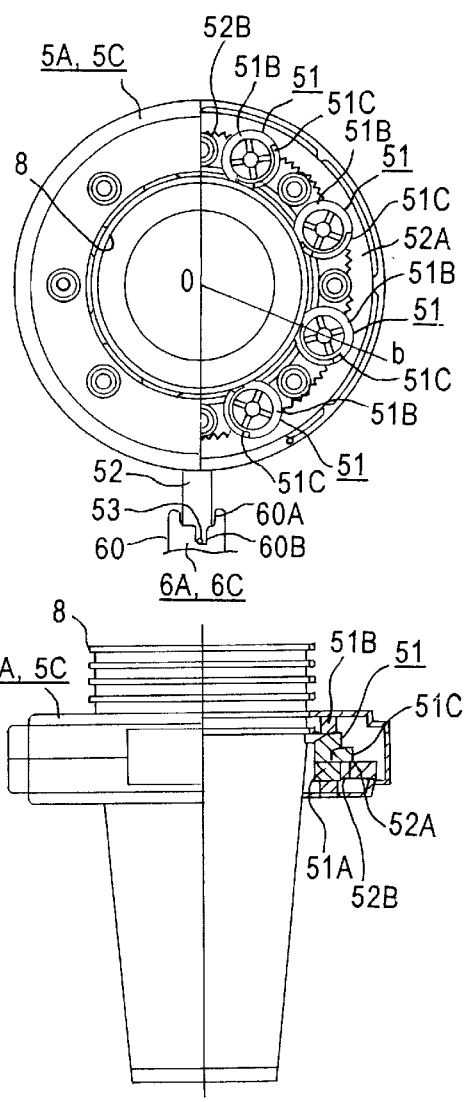

FIG. 16(a) shows cup dispenser 5A in the state of standing-by (after cup separation). The edge of cup 6 in the bottom of stack is supported by the upper end of screw portion 51B disposed on top 51. FIG. 16(b) shows the first stage of cup separation. Lever 52 is shifted to the indicated position according to a shift of slider 6A or 6C to the corresponding position. Top 51 is allowed to turn clockwise as ring 52A fixed to lever 52 turns clockwise. Thereby the edge of cup 8 in the bottom of stack is supported between screw portion 51B and step portion 51C.

Figure 16C:
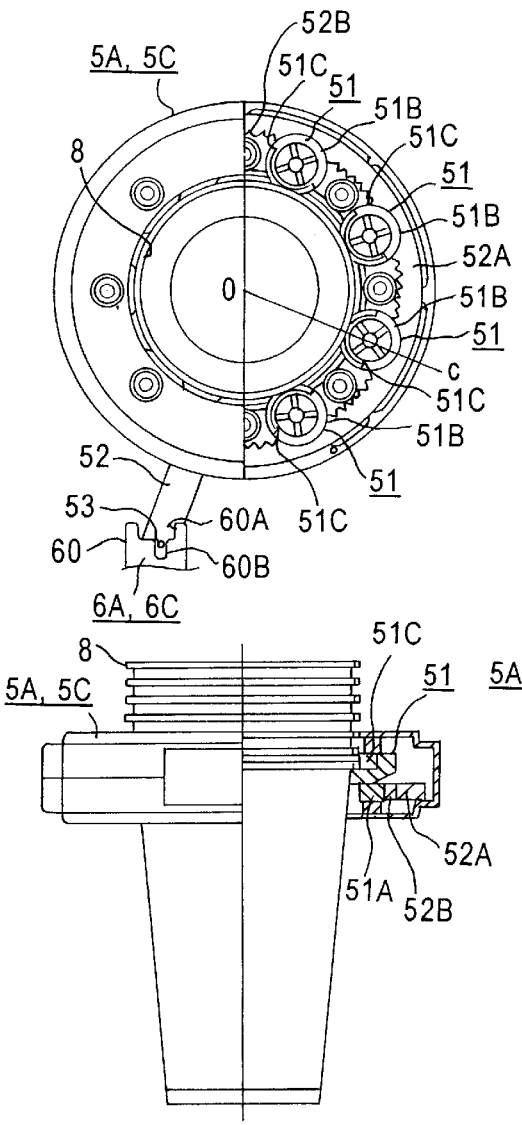

FIG. 16(c) shows the second stage of cup separation. Lever 52 is moved to the indicated position, allowing ring 52A to turn clockwise, as slider 6A or 6C moves to the corresponding position. Thereby, top 51 engaged with ring 52A is allowed to turn clockwise, so that the edge of cup 8 in the bottom of stack descends from the upper end of screw portion 51B to step portion 51C, where it is supported now. Thus, the stack of cup 8 descends downward in the distance corresponding to the height of step portion 51C.

Figure 16D:
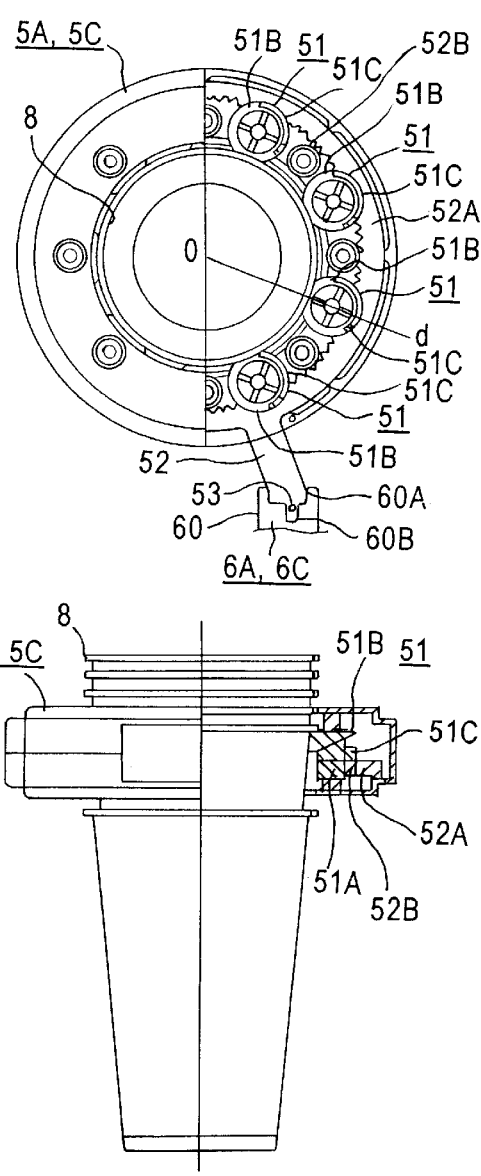

FIG. 16(d) shows the third stage of cup separation. Lever 52 is moved to the indicated position, allowing ring 52A to turn anti-clockwise, as slider 6A or 6C moves to the corresponding position. Thereby, top 51 engaged with ring 52A is allowed to turn anti-clockwise so that screw portion 51B is interposed between the edge of cup 8 in the bottom of stack supported by step portion 51C and cup 8 next thereto. Simultaneously, cup 8 in the bottom of stack is released from step portion 51C so as to fall down.

FIGS. 17(a) through 17(f) show cup-separating operation of cup dispenser 5B for cups of size M. The operation and function of top 51 are similar to those of cup dispensers 5A and 5C for cups of size L. Thus, only the operation of fork member 60 will be explained.

Figure 17A:
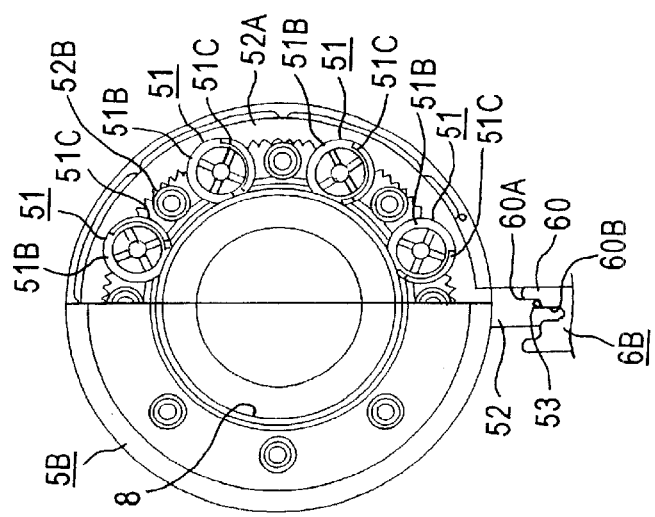
FIGS. 17($a$) through 17($f$) are explanatory views showing the cup-separating operation of another cup dispenser in the cup-supplying apparatus in the first preferred embodiment of the invention.

FIG. 17(a) shows cup dispenser 5B in the state of standing-by (after preceding cup separation). Link pin 53 is located to the left within broad opening 60A of fork member 60.

Figure 17B:
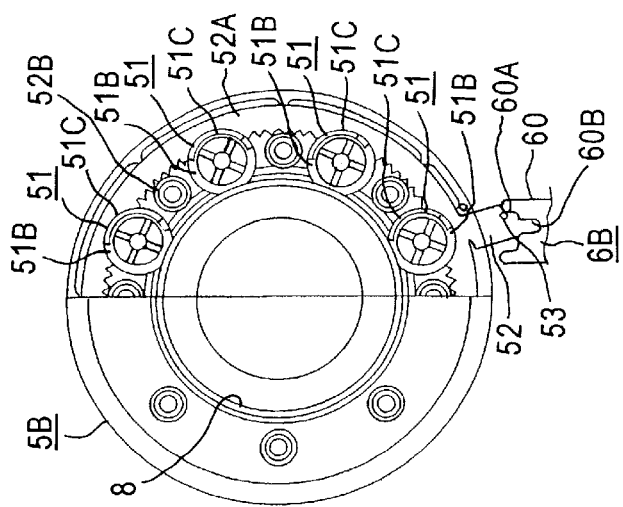

FIG. 17(b) shows the first stage of cup separation. As slider 6B is shifted to the left in the drawing in a distance equal to the margin of engagement (allowance of transmission) and located at the indicated position, link pin 53 takes its position on the right side within broad opening 60A.

Figure 17C:
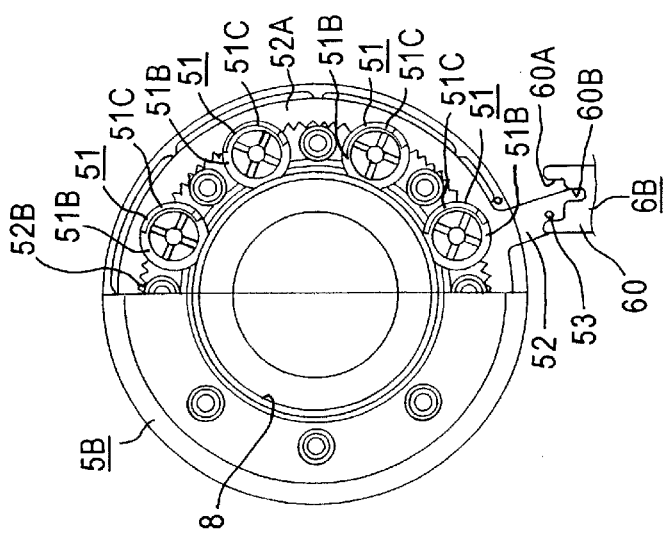

FIG. 17(c) shows the second stage of cup separation. Slider 6B has moved further (to the left in the drawing) until slider 6B takes the indicated position. Fork member 60 comes into contact with link pin 53 fixed to lever 52 and allows lever 52 and ring 52A to turn clockwise. This rotation of ring 52A causes top 51 to turn clockwise.

Figure 17D:
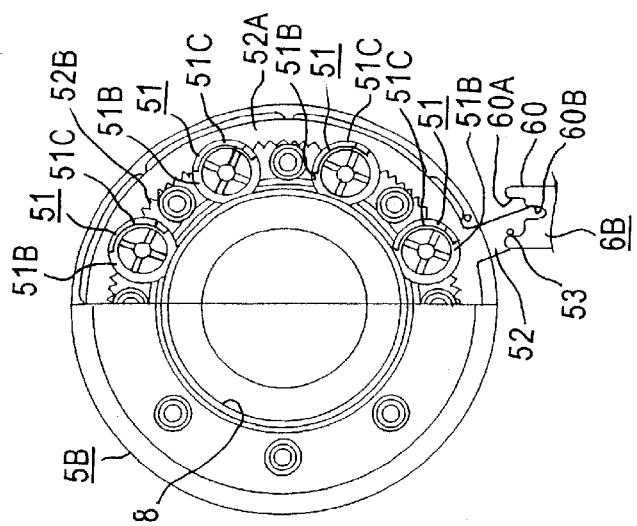

FIG. 17(d) shows the third stage of cup separation. Slider 6B has moved further to the left in the drawing until slider 6B takes the indicated position. Though broad opening 60A provides link pin 53 with a room (margin) for moving clockwise further, link pin 53 is moved no more because slider 6B begins to move in the reverse direction.

Figure 17E:
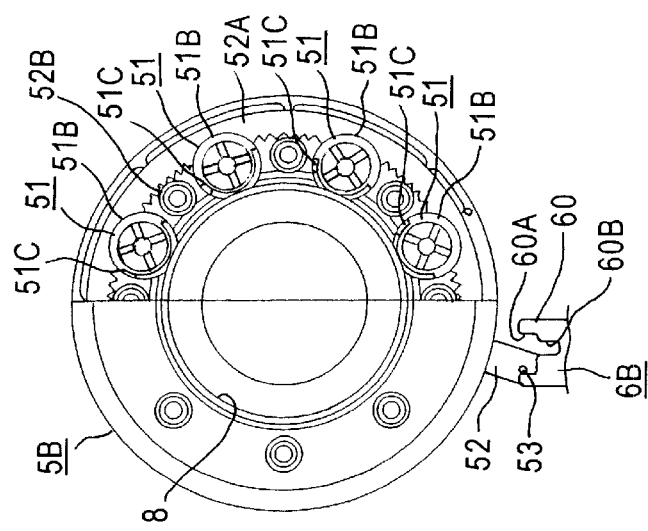

FIG. 17(e) shows the fourth stage of cup separation. Slider 6B moves to the right in the drawing until slider 6B takes the indicated position. Then link pin 53 is located on the left side within broad opening 60A, staying there. Lever 52 and ring 52A are ready to turn anti-clockwise as fork member 60 for slider 6B comes into contact with link pin 53 on the left side within broad opening 60A. The rotation of ring 52A causes top 51 to turn anti-clockwise.

Figure 17F:
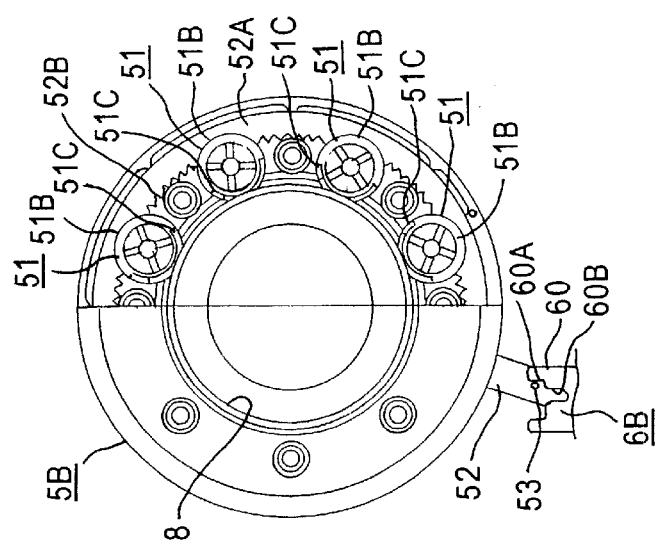

FIG. 17(f) shows the fifth stage of cup separation. Slider 6B has moved further to the right in the drawing until slider 6B takes the standing-by position.

By virtue of the construction described above, a cup dispenser can be easily and simply attached to and separated from a slider when the cup dispenser has to be renewed because sliders 6A, 6B and 6C are each provided with fork member 60 communicating with link pin 53 which is fixed to lever 52 for ring 52A in cup dispensers 5A, 5B and 5C.

For removing a cup dispenser, such as 5A, what is required is only removing cup dispenser 5A from cup storage unit 2 together with mounting member 30, as shown in FIGS. 15(a) and (b). For mounting cup dispenser 5A, what is required is only rotating lever 52 for ring 52A previously so that link pin 53 may be taken into fork member 60. In cup dispenser 5A or 5C, stroke d of the reciprocal movement of slider 6A or 6C brings moving range $L_1$ of link pin 53 held at narrow opening 60B of fork member 60. In cup dispenser 5B, fixed stroke d of the reciprocal movement of slider 6B causes only smaller moving range $L_2$ of link pin 53 because link pin 53 is held in broad opening 60A of fork member 60 with margin of movement LA. Cup dispensers 5A, 5B and 5C can, thus, be driven by fork members 60 in the same form each having two openings in the terminal portion and can be operated in common by slider unit consisting of sliders 6A, 6B and 6C.

Cam portion 16B is prevented from escaping from each of sliders 6A, 6B and 6C in driving operation because recess 6a is formed on the edge of each slider in the terminal portion so as to be engaged with projection 16a on the edge of cam portion 16B. Thus, transmission of the torque from cam portion 16B to sliders 6A, 6B and 6C is ensured.

In the aforesaid embodiment, the driving force of cam portion 16B is transmitted through linear reciprocating movement of sliders, 6A, 6B and 6C, respectively, each having fork member 60 engaged with link pin 53 on lever 52, so as to move the end of lever 52 in a circular arc. The reciprocating movement of sliders 6A, 6B and 6C may be movement in a circular arc like that of lever 52, in place of movement in a straight line.

Figure 18:
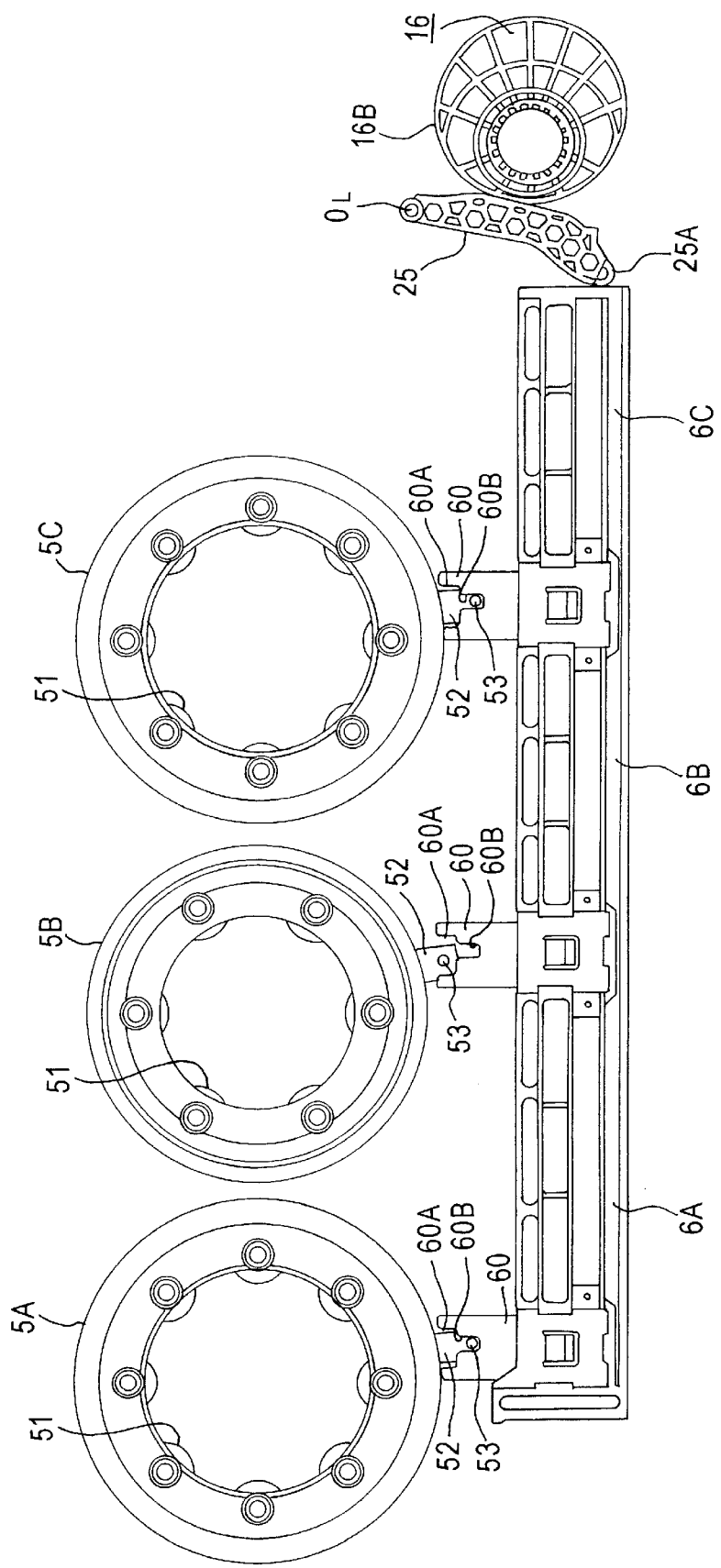
FIG. 18 is a plan view of a cup separation unit in the second preferred embodiment according to the invention.

FIG. 18 shows a cup supplying apparatus according to the second preferred embodiment of the invention, in which the movement of cam portion 16B is transmitted indirectly to slider 6C via lever 25 and further to sliders 6B and 6A in sequence. Lever 25 rotatable around point OL is engaged with cam portion 16B of top 16 in the middle portion and with slider 6C at the distal end. Slider 6C is connected to slider 6A through slider 6B. As distal end portion 25A of lever 25 pushes the distal end of slider 6C in accordance with the rotation of cam portion 16B, slider 6C and sliders 6B and 6A connected thereto are allowed to shift in the longitudinal direction so that corresponding cup dispensers 5A, 5B and 5C, respectively, are operated. Lever 25 is formed of three sheets stacked in parallel to sliders 6A, 6B and 6C. Top 16 is brought to a vertical position complying with one of the sliders, being driven by the position-selecting operation of a cam-driving unit such as described in the first preferred embodiment. As cam portion 16B of top 16 is rotated, distal end portion 25A of lever 25 pushes the end of slider.

Owing to use of lever 25 in the apparatus above, the amount of horizontal movement of the sliders can be increased because the tangential movement in the middle of lever 25 according to eccentric cam portion 16B is magnified in distal end portion 25A and transmitted to the sliders. For the equal amount of horizontal movement, cam portion 16B smaller in diameter can be used compared with the case without lever 25, thereby space saving is accomplished.

As described above, the job for renewing the cup dispenser is simplified, parts management is more easy and the costs thus can be decreased in the cup supplying apparatus according to the invention because the communicating members similar in the form can be used in common for varied cup sizes in the cup-supplying apparatus in which the means for reciprocal movement and that for circular movement are involved and communicating means formed of a pin and a recess fitting thereto is used for transmitting driving force of a reciprocally moving member to a rotatable ring member which regulates the cup-supplying.

Although the invention has been described with respect to specific embodiments for complete and clear disclosure, the appended claims are not to be thus limited but are to be construed as embodying all modifications and alternative constructions that may occur to one skilled in the art which fairly fall within the basic teaching set forth herein.

What is claimed is:

1. A cup-supplying apparatus for supplying tapered cylindrical cups stored in a stack, comprising:

a plurality of cup dispensers, each of which supplies a lowest cup from stacked cups to a predetermined position;

a unit for generating a cup-supplying force and transmitting said cup-supplying force, said unit having a first concave-convex portion;

a plurality of members, each of which transmits said cup-supplying force to a corresponding one of said plurality of cup dispensers and comprises a part contacting with said cup-supplying force generating unit, said contacting part having a second concave-convex portion which engages with said first concave-convex portion; and means for selecting one member from said plurality of members to be supplied with said cup-supplying force from said cup-supplying force generating-unit;

wherein said cup-supplying force generating-unit generates said cup-supplying force which is then transmitted to said one member selected by said selecting means, so that said corresponding one among said plurality of cup dispensers supplies said lowest cup to said predetermined position.

2. A cup-supplying apparatus as defined in claim 1, wherein:

each of said plurality of cup dispensers is provided respectively with a lever for receiving said cup-supplying force; and each said lever has said first convex-concave portion engaging with said second convex-concave portion of said plurality of members.

3. A cup-supplying apparatus for supplying tapered cylindrical cups stored in a stack, comprising:

a plurality of cup dispensers, each of which supplies a lowest cup from stacked cups to a predetermined position;

a unit for generating a cup-supplying force;

a plurality of members, each of which transmits said cup-supplying force to a corresponding one of said plurality of cup dispensers; and means for selecting one member from said plurality of members to be supplied with said cup-supplying force from said cup-supplying force generating-unit;

wherein said cup-supplying force generating-unit generates said cup-supplying force which is then transmitted to said one member selected by said selecting means, so that said corresponding one among said plurality of cup dispensers supplies said lowest cup to said predetermined position; and wherein each of said plurality of cup dispensers is provided respectively with a lever for receiving said cup-supplying force;

said cup-supplying force generating-unit comprises a motor and a cam which is rotated by said motor;

each of said plurality of members is a slider provided between said lever and said cam; and said selecting means is a mechanism for moving said cam up and down, so that said cam is rotated at a position level at which said slider is positioned to transmit said cup-supplying force to said lever of said corresponding one of said plurality of said cup dispensers.

4. A cup-supplying apparatus for supplying tapered cylindrical cups stored in a stack, comprising:

a rotatable ring member having inside thereof a circular inner portion for supporting said stack of cups, said member being capable of rotating around an axis, diameter of said inner portion being varied in accordance with rotating of said member within a range predetermined according to diameter of said tapered cylindrical cups;

means for separating a tapered cylindrical cup in lowest position in said stack from others stored in said stack and allowing said tapered cylindrical cup in said lowest position to drop, according to rotating of said rotatable ring member;

means for rotating said rotatable ring member, including a lever attached to and rotatable together with said rotatable ring member around said axis of rotating thereof and a pin fixed to said lever in rotatable end portion thereof;

a reciprocally-moving member capable of reciprocal movement in a first direction and in a second direction with a predetermined stroke, being driven by a driving force supplied by a source thereof; and movement-transmitting means for transmitting said reciprocal movement of said reciprocally-moving member to said rotatable ring member to cause said rotatable ring member to rotate clockwise and anti-clockwise, said movement-transmitting means comprising pin-engaging means for engaging said pin with said reciprocally-moving member, whereby said reciprocally-moving member is engaged with said means for rotating said rotatable ring member by way of said pin fixed to said lever and said pin-engaging means, wherein:

said pin-engaging means comprises range-varying means which allows said range of rotating of said lever corresponding to said pre-determined stroke of said reciprocal movement of said reciprocally-moving member transmitting means to be varied, whereby said range of rotating of said rotatable ring member is determined by said range-varying means.

5. A cup-supplying apparatus as defined in claim 4, wherein said pin-engaging means includes a fork member having a recess in distal end portion.

6. A cup-supplying apparatus as defined in claim 5, wherein said fork member comprises a first recess for accepting said pin with a first margin and a second recess for accepting said pin with a second margin broader than said first margin, whereby said first recess allows said lever having said pin to rotate within a first range and said second recess allowing said lever to rotate within a second range smaller than said first range, either according to said predetermined stroke of reciprocally-moving member.

7. A cup-supplying apparatus as defined in claim 6, wherein said first recess is formed adjacent to a bottom portion of said second recess.

8. A cup-supplying apparatus as defined in claim 4, wherein said rotatable ring member, said means for separating a tapered cylindrical cup and said means for rotating said rotatable ring member are integrated in a unit.

9. A cup-supplying apparatus as defined in claim 8, further comprising a plurality of said units, a plurality of said reciprocally-moving member and a plurality of said movement-transmitting means, equal in numbers and said reciprocally-moving members are driven by said source in common.

10. A cup-supplying apparatus as defined in claim 9, wherein said plurality of said reciprocally-moving members are conjugated, being permitted to move independently.

11. A cup-supplying apparatus as defined in claim 9, wherein said plurality of movement-transmitting means each comprise pin-engaging means in same form, respectively.

12. A cup-supplying apparatus as defined in claim 11, wherein said pin-engaging means are connected respectively with said plurality of said reciprocally-moving members conjugated to be capable of moving independently.

13. A cup-supplying apparatus as defined in claim 4, wherein said reciprocally-moving member comprises a rotating motor as said source of driving force.

14. A cup-supplying apparatus as defined in claim 13, wherein said reciprocally-moving member comprises a cam unit for transmitting rotation of said rotating motor to reciprocal movement of said reciprocally-moving member.

15. A cup-supplying apparatus as defined in claim 14, wherein said reciprocally-moving member comprises means for preventing said cam unit from accidental discontinuing said transmitting.

* * * * *